United States Patent
Rutterman et al.

(10) Patent No.: US 6,701,047 B1
(45) Date of Patent: Mar. 2, 2004

(54) FIBER OPTIC BUFFER UNIT AND CABLES INCLUDING THE SAME

(75) Inventors: Daniel J. Rutterman, Hickory, NC (US); William C. Hurley, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 09/282,343

(22) Filed: Mar. 31, 1999

(51) Int. Cl.⁷ .................................................. G02B 6/44
(52) U.S. Cl. ....................................... 385/102; 385/103
(58) Field of Search .................................. 385/102, 103

(56) References Cited

U.S. PATENT DOCUMENTS

| | | | |
|---|---|---|---|
| 4,740,053 A | * | 4/1988 | Cassidy .................. 350/96.23 |
| 4,767,183 A | * | 8/1988 | Martin .................... 174/120 C |
| 4,781,433 A | | 11/1988 | Arroyo et al. ............ 350/96.23 |
| 5,408,564 A | | 4/1995 | Mills ........................... 385/128 |
| 5,740,295 A | | 4/1998 | Kinard et al. ................ 385/109 |
| 5,978,536 A | | 11/1999 | Brandi et al. ................ 385/102 |
| 6,134,360 A | | 10/2000 | Cheng et al. .................. 385/39 |

FOREIGN PATENT DOCUMENTS

EP   0 762 171 A1   3/1997   ............. G02B/6/44

OTHER PUBLICATIONS

"Art" admitted date Sep. 31, 1998.

* cited by examiner

*Primary Examiner*—Frank G. Font
*Assistant Examiner*—Andrew H. Lee
(74) *Attorney, Agent, or Firm*—Timothy J. Aberle

(57) ABSTRACT

A unitized fiber optic cable (10) having cables (20) with respective buffer units (30) therein. Each buffer unit (30) includes at least two optical fibers (31) generally tightly held by a buffer layer (32) for sliding contact therewith. The buffer units (30) can be stranded about a central member (22) and enclosed in a jacket (28).

14 Claims, 2 Drawing Sheets

FIBER OPTIC BUFFER UNIT AND CABLES INCLUDING THE SAME

The present invention relates to buffer units and fiber optic cables including the same that can meet burn, mechanical, and/or environmental requirements.

Conventional fiber optic cables comprise optical fibers which are used to transmit voice, video, and data information. The packaging of optical fibers in a fiber optic cable should facilitate installation and connectorization processes. In addition, fiber optic cables may be required to meet burn testing and general mechanical/environmental requirements.

Multi-fiber Connectors

Advances in fiber optic connector design have led to the development of multi-fiber connectors. During a typical connectorization process for conventional 900 micron tight buffered fibers with a multi-fiber connector, the bulk of buffer material at the fiber insertion side of the multi-fiber connector can result in connectorization difficulties. Additionally, handling and routing of optical fibers is difficult in fiber distribution centers and connector panels that are overcrowded with a large number of buffered fibers, subunits, and cables. Moreover, connectorization/fusion processes can cause buffer layer shrink-back that can leave optical fibers unprotected.

General Mechanical/Environmental Requirements for Fiber Optic Cables

Mechanical and environmental tests for fiber optic cables are defined in, for example, ICEA S-83-596-1994 (ICEA-596). The mechanical tests of ICEA-596 include, for example, tensile, compression, cycle flex, and impact tests. In addition, the environmental tests of ICEA-596 include temperature cycling. Fiber optic cables not able to withstand the rigors of the foregoing tests may be rejected by customers for certain applications.

Burn Testing Requirements for Fiber Optic Cables Designed for Indoor Use

Indoor fiber optic cables have been developed for installation in plenums and risers, and/or ducts of buildings. In order for a fiber optic cable to be rated for riser or plenum use, the cable must meet flame retardance standards as determined by means of vertical or horizontal flame tests. Exemplary requirements for such tests have been established by Underwriters Laboratories (UL). Since riser cables are typically installed in vertical shafts, the relevant standard for riser rated fiber optic cables is embodied in UL 1666, a flame test in a vertical shaft without a forced air draft in the shaft. UL 1666 does not include a smoke evolution requirement. UL has promulgated the riser rating requirements in a document entitled "Test for Flame Propagation Height of Electrical and Optical-Fiber Cables Installed Vertically in Shafts", wherein values for flame propagation height are set forth. Examples of riser rated fiber optic cables are disclosed in EP-A1-0410621 and U.S. Pat. No. 5,748,823 which is incorporated by reference herein.

Specifics on Plenum Rated Cables

The relevant standard for plenum rated fiber optic cables is embodied in UL 910, a horizontal flame test setting forth flame propagation and smoke evolution requirements. In the construction of many buildings, a plenum can include, for example, a space between a drop ceiling and a structural floor above the drop ceiling. A plenum typically serves as a conduit for forced air in an air handling system, and the plenum is oftentimes a convenient location for the installation of fiber optic cables. If, in the event of a fire, the fire reaches the plenum area, flames that would otherwise rapidly propagate along non-plenum rated cables are retarded by plenum rated cables. Moreover, plenum rated cables are designed to limit smoke evolution. Riser rated cables tested to UL 1666 may not exhibit acceptable flame spread and smoke evolution results and would therefore be unsuitable for plenum use.

The UL 910 test is promulgated by UL in a document entitled: "Test for Flame Propagation and Smoke-Density Values for Electrical and Optical-Fiber Cables Used in Spaces Transporting Environmental Air". A key feature of the UL 910 test is the Steiner Tunnel (horizontal forced air draft) test as modified for communications cables. During the UL 910 test, flame spread values are observed for a predetermined time (20 minutes under the current standard), and smoke is measured by a photocell in an exhaust duct. Data from the photocell measurements are used to calculate peak and average optical density values. Specifically, according to UL 910, the measured flame spread must not exceed five feet, peak smoke (optical) density must not exceed 0.5, and average smoke (optical) density must not exceed 0.15. In general, for UL 1666, the measured flame spread must not exceed 12 ft. or 850° F.

Materials and Designs for Meeting Burn Test Requirements

In order to meet the foregoing burn test standards, various cable materials for the prevention, inhibition, and/or extinguishment of flame, used in riser or plenum cables, may fall into two general categories. The first category includes inherently inflammable, flame-resistant materials which are thermally stable, and may have high decomposition temperatures, for example, certain metals or high temperature plastics. The materials included in the first category can be useful as thermal/heat/flame barriers. Thermal/heat/flame barriers may have disadvantages, however, as they can be generally expensive and, because of limited burn-performance characteristics, they may be limited to a narrow range of applications.

The second general category of materials used for the prevention, inhibition, and/or extinguishment of flame includes inherently flammable materials that include flame retardant additives. Such additives actively interfere with the chemical reactions associated with combustion. Examples of inherently flammable materials are polyethylene, polypropylene, polystyrene, polyesters, polyurethanes, and epoxy resins. Typical flame retardant additives include aluminum trihydrate, metal hydroxides, brominated and chlorinated organic compounds, and phosphate compounds.

By comparison, thermal/heat/flame barriers typically do not include flame retardant additives, but are relied upon in flame protection designs for their resistance to decomposition at high temperatures, or their inherent heat dissipation properties. An example of a fiber optic cable that requires a thermal barrier, and is designed for use in plenum applications, is disclosed in U.S. Pat No. 4,941,729 which is incorporated by reference herein. The thermal barrier is a laminate of a non-flammable metallic material and a plastic material. The thermal barrier is wrapped around conductors so that longitudinally extending edges of the barrier are positioned in overlapping engagement. Although this known fiber optic cable is taught to have thermal/heat resistance, this design has several disadvantages. For example, the thermal barrier is required for flame retardance and requires two layers of material, the collective thicknesses and stiffnesses of which can result in an undesirably heavy and stiff plenum cable. The weight and stiffness can make the cable difficult to route through plenum passageways during installation, and the metal layer of the barrier typically requires grounding during installation. Additionally, the barrier necessarily contributes to manufacturing complexities and the unit cost of the cable.

Objects of the Invention

It is an object of the present invention to provide a unitized fiber optic cable that facilitates connectorization, meets mechanical and environmental requirements, improves fiber packing density without increasing the cable size or flame retardant additive content, and is suitable for indoor use.

It is an object of the present invention to provide a fiber optic cable comprising: at least one buffer unit, the buffer unit comprising at least two optical fibers in a buffer layer, the buffer layer having a nominal OD of about 900 microns (±100 microns); a layer of strength members; and a cable jacket surrounding the at least one buffer unit and the strength members.

It is an object of the present invention to provide a fiber optic buffer unit comprising: optical fibers in a buffer tube having a nominal OD of about 900 microns (±100 microns), the optical fibers being tightly held by the buffer tube in a way that inhibits fiber cross-overs but permits sliding contact between the fibers and the buffer tube.

It is an object of the present invention to provide a fiber optic buffer unit comprising: optical fibers in a common buffer layer, the optical fibers being held by the buffer layer in a way that inhibits fiber cross-overs but permits sliding contact between the fibers and the buffer layer, the buffer layer comprising a composite of a liquid crystal polymer and a thermoplastic.

It is an object of the present invention to provide a fiber optic buffer unit comprising: optical fibers in a common buffer layer, the buffer layer being dimensioned such that portions of outer surfaces of each optical fiber touch each other, and other portions of the optical fibers touch the buffer layer, the optical fibers being held by the buffer layer in a way that inhibits fiber crossovers but permits sliding contact between the fibers and the buffer layer.

BRIEF DESCRIPTION OF THE DRAWING FIGURES

DETAILED DESCRIPTION OF THE INVENTION

Figure 1:
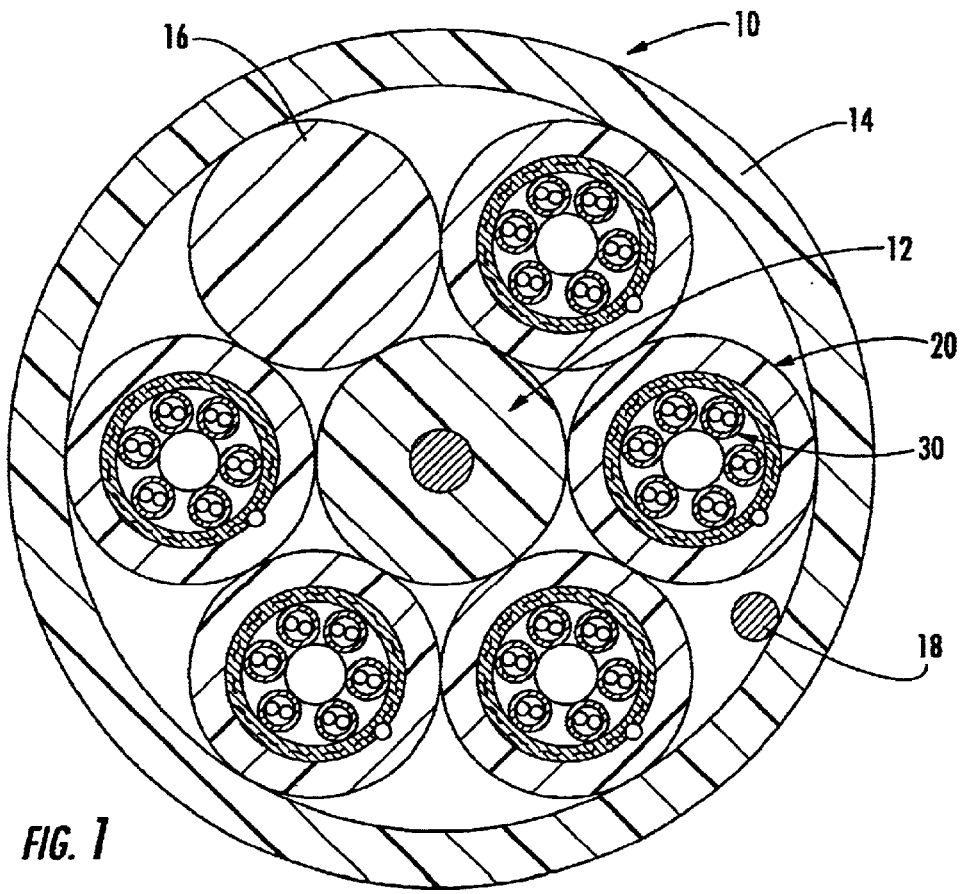
FIG. 1 is cross sectional view of a unitized fiber optic cable according to the present invention.
Figure 2:
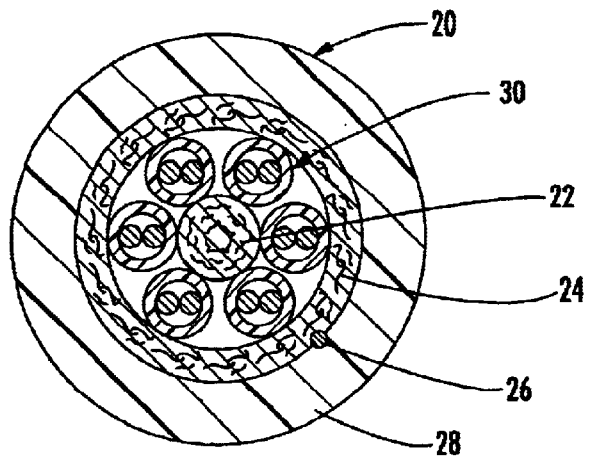
FIG. 2 is cross sectional view of a cable according to the present invention.
Figure 3:
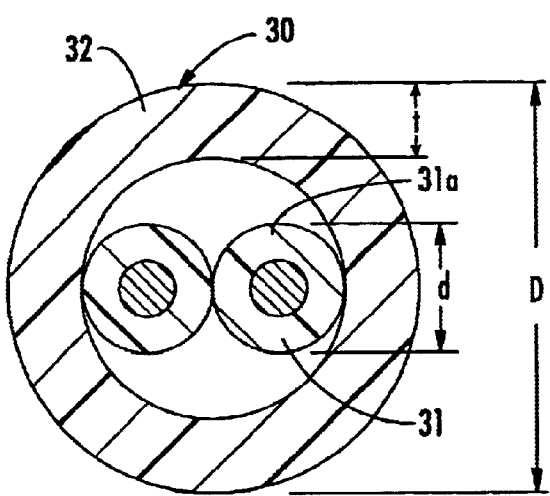
FIG. 3 is a cross sectional view of a buffer unit according to the present invention.

Referring to FIGS. 1–3, a unitized fiber optic cable 10 according to the present invention will be described. Unitized fiber optic cable 10 includes cables 20 stranded about a central member 12. Central member 12 can include a suitable thermoplastic layer over a steel wire, for example, a flame/smoke suppressant thermoplastic, or it can be a completely dielectric, e.g., glass or fiber reinforced construction. Cables 20 are surrounded by a flame/smoke retardant thermoplastic cable jacket 14 formed of, for example, polyvinylchloride (PVC). Alternatively, jacket 14 may be formed of a plenum grade flame retarded PVC (FRPVC) having flame retardant and/or smoke suppressant type additives, as disclosed in U.S. Pat No. 5,698,323. As an alternative to FRPVC, jacket 14 may include a fluoro-plastic, e.g., polyvinylidene fluoride (PVDF), a fluoro-compound as disclosed in U.S. Pat. No. 496,3,609, or blends of FRPVC/PVDF may be used. Additionally, for low smoke zero halogen (LSZH) applications jacket 14 can include a flame retardant polyethylene (FRPE), or other material as disclosed in U.S. Pat No. 5,748,823 incorporated by reference herein.

Unitized fiber optic cable 10 can include one or more filler rods 16 formed of, for example, a flame/smoke suppressant thermoplastic material or a glass or fiber reinforced rod. Unitized fiber optic cable 10 can include a ripcord 18.

Cable 20 (FIG. 2) can include a dielectric central member 22 about which buffer units 30 are stranded, a layer of dielectric strength members 24 surrounding buffer units 30, and a jacket 28 surrounding strength members 24. In addition, cable 20 may include a ripcord 26 between strength members 24 and jacket 28. Central member 22 may be a relatively stiff fiber or glass reinforced plastic rod that may include a plastic overcoating. Alternatively, central member 22 may be a flexible bundle of strength members, e.g., aramid yarn or fiber glass that may include a thermoplastic overcoating. Strength members 24 are preferably longitudinally disposed or stranded about cables 20. Jacket 28 can be made of the same materials that jacket 14 is made of, or it can be made of any other suitable thermoplastic material.

Buffer units 30,40,50,60 (FIGS. 3–6) each include at least two optical fibers 31 that can be single mode, multi-mode, and/or multi-core optical fibers. Each optical fiber can have a glass core, and inner and outer primary coatings of a thermoplastic that is surrounded by a coloring layer 31a having a nominal outside diameter d of about 260 microns (±20 microns) (FIG. 3). A tight buffer coating over the coloring layer is not altogether necessary, but in some applications it may be desired. Buffer units 30,40,50 can each include a buffer layer, for example, a generally round buffer tube 32 with a nominal wall thickness t of about 170 microns, and a maximum wall thickness of about 240 microns (FIG. 3). Buffer tube 32 can be dimensioned to include, for example, a nominal inside diameter roughly equal to an integer multiple of a nominal outside diameter of optical fiber 31. For example, the inside diameter of buffer tube 32 can be about twice nominal diameter d. In addition, buffer tube 32 can include a nominal outside diameter D of about 900 microns (±100 microns). The dimensions of tube 32 can be such that portions of the outer surfaces of each optical fiber 31 will touch each other, and other portions will touch buffer tube 32, in a manner that permits sliding contact therebetween. On the other hand, tube 32 is dimensioned so that fibers 31 are held tight enough to inhibit twisting and/or cross-overs of the optical fibers. For example, with reference to buffer unit 30, a sum of the discrete clearances between the optical fibers themselves, and between the fibers and buffer tube 32, can be less than the outside diameter of one optical fiber 31.

Figure 4:
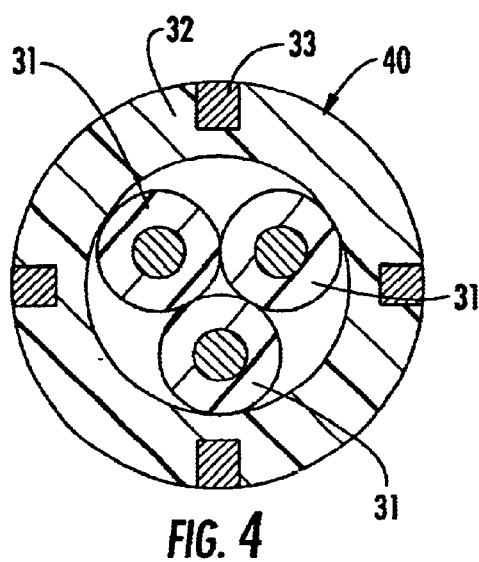
FIG. 4 is a cross sectional view of a buffer unit according to the present invention.
Figure 5:
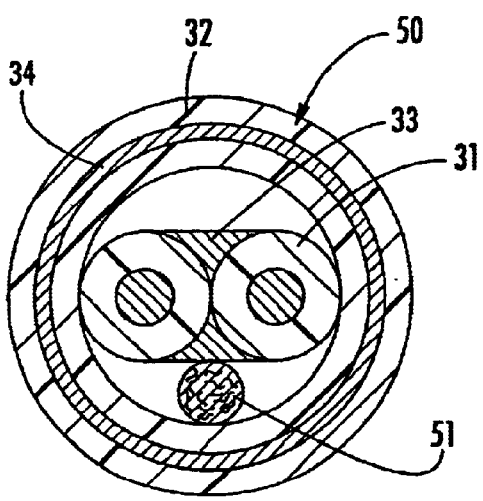
FIG. 5 is a cross sectional view of a buffer unit according to the present invention.
Figure 6:
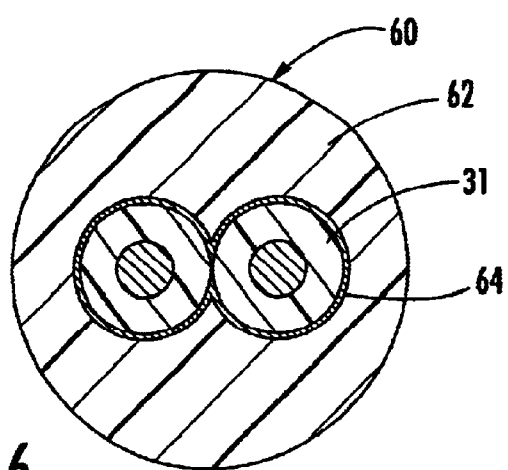
FIG. 6 is a cross sectional view of a buffer unit according to the present invention.

In another aspect of the present invention, optical fibers 31 can be connected by, for example, a UV curable ribbon matrix 33 (FIG. 5). In yet another aspect of the present invention, the respective buffer layers of buffer units 30,40, 50,60 may be a composite of distinct polymers. More specifically, the buffer layers can include a thin longitudinal layer 34 (FIG. 5) or longitudinal segments 33 (FIG. 4) formed of a liquid crystal polymer. When manufacturing the buffer layers, the liquid crystal polymer can be applied by co-extrusion with the base thermoplastic resin.

Buffer tubes 32 can be formed of a non-halogenated thermoplastic with low smoke evolution characteristics having, for example, a suitable limiting oxygen index. For example, the buffer tube material can be a flame retarded, non-halogenated polyolefin (FRPO), e.g., a flame retarded polyethylene (FRPE) or a flame retarded polypropylene (FRPP). FRPE is typically not a plenum grade material as it has little or no resistance to flame spread above certain temperatures, but it has low smoke evolution characteristics. Other suitable materials include flame retarded EVA, Nylon, and polyesters, e.g., co-polyesters as disclosed in U.S. Pat. No. 4,708,975, U.S. Pat. No. 4,994,549, or U.S. Pat. No. 4,826,899 which patents are respectively incorporated by reference herein.

A buffer unit can include more than two optical fibers, for example, as embodied by buffer unit 40 (FIG. 4).

Additionally, a buffer unit can include a waterblocking substance, e.g., a superabsorbent powder and/or a waterblocking yarn 51, for example, as embodied by buffer unit 50 (FIG. 5). Moreover, a buffer unit can include a buffer layer comprising a buffer layer 62, having a nominal outside diameter of about 900 microns (±100 microns) as embodied by buffer unit 60 (FIG. 6), for generally tightly holding fibers 31. Buffer unit 60 can include an interfacial layer 64 that is applied to optical fibers 31 before application of buffer layer 62. Interfacial layer 64 can be a cross-linked, solid material as described in U.S. Pat. No. 5,761,363 and U.S. Pat. No. 5,408,564, which patents are respectively incorporated by reference herein. Interfacial layer 64 advantageously provides a controlled bond between buffer layer 62 and optical fibers 31 so that buffer 62 can be easily stripped from optical fiber 31 during a termination and/or fusion splicing procedure.

Buffer units according to the present invention offer the advantages of ease of handling and connectorization to multi-fiber connectors. More specifically, respective buffer units 30,40,50,60 with an appropriate number of optical fibers therein can be provided for each fiber insertion aperture of the multi-fiber connector. Multiple fibers 31 in a nominal 900 micron OD buffer tube 31 or jacket 62 reduces the bulk of material at the back of the multi-fiber connector thereby rendering the connectorization, and handling and routing of optical fibers less difficult. Moreover, the liquid crystal polymer layer 34 and segments 33 can impart resistance to shrink-back of the buffer layer during connectorization and/or fusion splicing procedures. In addition, fiber optic cables according to the present invention have a high packing density, especially where second and third layers of cables 20 are added. For example, the fiber count can be 2 to 288 optical fibers or more for buffer units with two fibers, 432 fibers or more for three-fiber buffer units, and 576 fibers or more for a four-fiber buffer unit (not shown). Fiber optic cables made according to the present invention are suitable for use in plenum and/or riser applications. In addition, fiber optic cables made according to the present invention advantageously meet ICEA-596 requirements with respect to mechanical tests, for example, tensile, compression, cycle flex, and impact tests. In addition, fiber optic cables made according to the present invention have passed the ICEA-596 environmental tests, for example, temperature cycling and cable aging.

The present invention has thus been described with reference to the foregoing embodiments, which embodiments are intended to be illustrative of the inventive concepts rather than limiting. Persons of skill in the art will appreciate that variations and modifications of the foregoing embodiments may be made without departing from the scope of the appended claims. Tubes 32 and jacket 62 can comprise multiple layers of thermoplastics, for example, as disclosed in U.S. Pat. No. 4,664,472 which patent is incorporated by reference herein. The inner surface of tubes 32 can include a friction-reducing substance, for example TEFLON, for enhancing sliding contact between optical fibers 31 and buffer tube 32. Since cables of the present invention can be designed for indoor use, waterblocking hydrocarbon greases are typically not preferred. On the other hand, unitized fiber optic cable 10, cables 20, and/or buffer units 30,40,50,60 can be used for outdoor or indoor/outdoor applications as well, in which event it may be desirable to include a suitable superabsorbent powder, tape, yarn, waterblocking grease, and/or gel therein. Moreover, the present invention includes buffer units 30,40,50,60 where they define the core of a fiber optic cable, e.g., for single tube or interconnect/jumper cables. In this embodiment, a layer of strength members and a cable jacket can be provided about a single buffer unit 30,40,50,60. Buffer units 30,40,50,60 may include one or more strength filaments, e.g., aramid fibers, inside the buffer layer.

Accordingly, what is claimed is:

1. A fiber optic buffer unit comprising:
   optical fibers in a buffer tube, the buffer tube having a nominal OD of about 900±100 microns and a nominal wall thickness of about 240 microns or less, wherein said optical fibers are tightly held by said buffer tube thereby inhibiting fiber cross-overs while permitting sliding contact between the fibers and the buffer tube.

2. The fiber optic buffer unit of claim 1, a clearance of about 100 microns or less being defined between at least one of said fibers and said buffer tube.

3. The fiber optic buffer unit of claim 1, said optical fibers being connected by a ribbon matrix.

4. The fiber optic buffer unit of claim 1, at least one of said optical fibers comprising an outermost coloring tube in at least partial contact with said buffer tube.

5. The fiber optic buffer unit of claim 1, said buffer tube having an inside diameter that is based upon an integer multiple of an outside diameter of at least one of said optical fibers.

6. The fiber optic buffer unit of claim 1, said buffer tube comprising a composite of a liquid crystal polymer and a thermoplastic.

7. A fiber optic buffer unit comprising:
   optical fibers, the optical fibers having a predetermined maximum dimension; and
   a common buffer layer, the common buffer layer having a predetermined inner diameter, wherein said predetermined inner diameter is selected relative to the predetermined maximum dimension so that said optical fibers are held by said buffer layer, thereby inhibiting optical fiber crossovers while permitting sliding contact between the optical fibers and the buffer layer, said buffer layer comprising a composite of a liquid crystal polymer and a thermoplastic.

8. The fiber optic buffer unit of claim 7, clearance of about 100 microns or less being defined between at least one of said fibers and said buffer tube.

9. The fiber optic buffer unit of claim 7, said optical fibers being connected by a ribbon matrix.

10. The fiber optic buffer unit of claim 7, said predetermined inner diameter based upon an integer multiple of an outside diameter of at least one of said optical fibers.

11. A buffer unit comprising:

optical fibers in a common buffer layer, said optical fibers including a glass core, and at least one coating of a thermoplastic material disposed radially outward of said glass core that is surrounded by a coloring layer; said buffer layer being dimensioned such that at least portions of said coloring layers touch each other, and at least other portions of said coloring layers touch said buffer layer, wherein said optical fibers are held by said buffer layer thereby inhibiting fiber cross-overs but permitting sliding contact between the fibers and the buffer layer, wherein a sum of discrete clearances between the optical fibers, and between the optical fibers and said buffer layer are less than the nominal outside diameter of one of said optical fibers.

12. The buffer unit of claim 11, said buffer layer comprising a nominal inside diameter based upon an integer multiple of a nominal outside diameter of one of said optical fibers.

13. The buffer unit of claim 11, a sum of discrete clearances between the optical fibers, and between the optical fibers and said buffer layer being less than the nominal outside diameter of one of said optical fibers.

14. The buffer unit of claim 11, respective outer diameters of said coloring layers being about 260 ±20 microns.

* * * * *